Aug. 4, 1953  E. B. MILLER  2,647,370
WATER HEATING SYSTEM
Filed Jan. 31, 1950
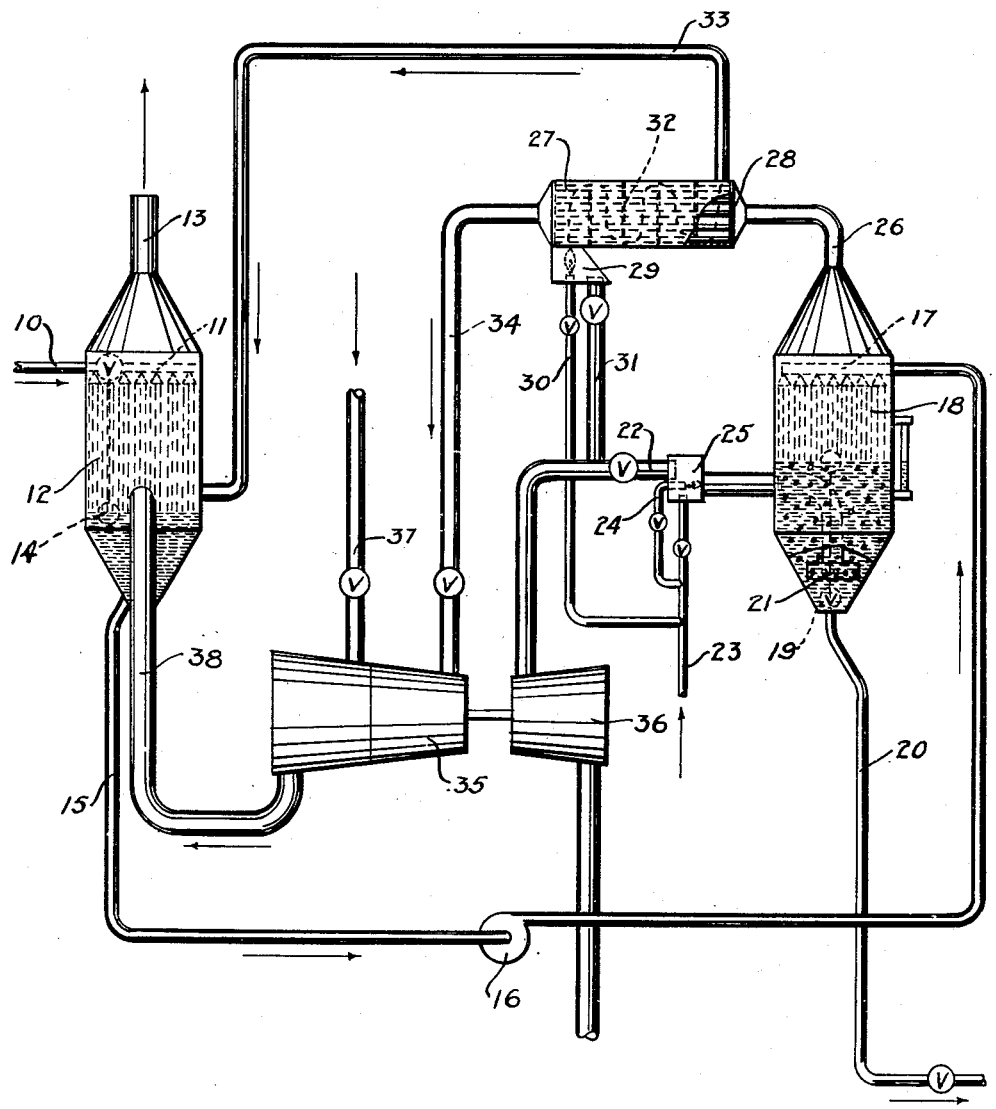
INVENTOR
E. B. Miller
BY Adams & Bush
ATTORNEY

UNITED STATES PATENT OFFICE 2,647,370

WATER HEATING SYSTEM

Ernest B. Miller, Houston, Tex., assignor to Jefferson Lake Sulphur Company, New Orleans, La., a corporation of New Jersey Application January 31, 1950, Serial No. 141,431

3 Claims. (Cl. 60—39.57)

This invention relates to appartus for heating water and, among other objects, aims to provide economical means for heating large quantities of water for use in mining sulphur and in other commercial operations.

Another object of the invention is to provide simplified apparatus employing submerged combustion burners having enormous water heating capacity in proportion to the size of the equipment, so that it can be dismantled and transported from one location to another at a minimum expense. The idea is to eliminate the expense of setting up large, stationary boilers and other equipment customarily employed for heating water used in mining sulphur, and for other purposes.

Another aim of the invention is to provide greatly improved equipment for heating large quantities of water, wherein a submerged combustion burner is employed to heat the water under pressure and the products of combustion or flue gases used to drive a gas turbine or motor and a compressor which supplies air to the burner. Also, the idea is to use the exhaust gas from the turbine and flue gas to preheat feed water supplied to the system.

Other aims and advantages of the invention will appear in the specification when considered in connection with the accompanying drawing, wherein:

The figure is a diagrammatic view or schematic diagram of apparatus embodying the invention.

Referring now particularly to the illustrated apparatus, the invention provides a submerged combustion burner for heating water under pressure, means for re-heating the flue gas from the burner to a sufficient temperature to drive a gas turbine which operates an air compressor to supply air to the submerged burner and the re-heater, and means for pre-heating the feed water by direct heat exchange with the flue gas from the re-heater and the exhaust gas from the turbine.

In the illustrated example, feed water is supplied by a pipe line 10 having a spray head 11 in the upper portion of a vertical pre-heating or economizer tank 12 which has an open outlet flue 13 at its upper end. The water level in the lower portion of the tank 12 may be maintained by a control valve operated by a float 14.

The pre-heated water is delivered from the bottom of the economizer tank 12 through a pipe 15 by a pump 16 to a spray head 17 in a vertical heating tank 18, wherein the water is maintained under pressure. The water level may be maintained in the lower portion of this tank by a float valve 19 which controls the discharge to a delivery pipe 20 leading to a point of use. However, the discharge pipe may be connected to the tank 18 at the desired water level, in which case the float valve will be omitted.

The water in the tank 18 is heated by a submerged gas burner 21, which is supplied with air under pressure through a conduit 22, gas being delivered through a valved gas line 23. The gas is adapted to be ignited in a well known manner. For convenience, it is shown as being ignited by a pilot burner 24 within a housing 25. Flames from the burner 21 are quenched by the water in the bottom portion of the tank 18, and the hot products of combustion discharge upwardly through the water spray from the spray head 17; thence, through a flue 26 and a re-heater 27 of the fire tube type. That is to say, the flue gas passes through tubes in the re-heater and absorbs heat delivered thereto.

The re-heater 27 is shown as being in the form of an ordinary horizontal cylinder having tube sheets 28 at its opposite ends. A gas burner 29 is connected to the end of the re-heater remote from the inlet flue 26 and is supplied with gas through a pipe 30 and air through a conduit 31. The air conduit is preferably connected to the main air conduit 22. The re-heater is preferably provided with a series of staggered baffles 32 to cause the hot gases to pass therethrough in a zig-zag path. The flue gas from the re-heater is discharged through an outlet flue or conduit 33 to the economizer tank 12, just above the water level, so that it comes in direct heat exchanging contact with the water spray from the head 11.

The re-heated flue gas is delivered through a conduit 34 connected to drive a motor, preferably in the form of a gas turbine 35, which drives an air compressor 36 connected to deliver combustion supporting air to the main air conduit 22. Of course, the turbine may be used to drive the water pump 16 and other auxiliary equipment. Exhaust gas from the turbine is discharged through an exhaust conduit 38 to the economizer tank above the water level therein, also to exchange its heat directly with the water sprays.

Obviously, the gas turbine may be started by an ordinary electric motor, or a gas engine, when steam is not available. In this example, the turbine is of the well known twin or mixed fluid type adapted to be started by steam and then driven by the hot flue gas. Steam is supplied for starting it through a steam conduit 37. The steam will be cut off as soon as the hot flue gas is available.

In the operation of the system for mining sulphur, for example, the feed water is pre-heated to a temperature of about 150° F. to 160° F. The pressure in the heating tank is maintained at about 45 to 60 pounds gage by the air compressor, so that the water is heated to a temperature of about 300° F. to 310° F. The flue gas from the heating tank is reheated to a temperature of 800° F. to 1000° F. for driving the turbine. The hot water is discharged from the heater under its own pressure and delivered through the usual insulated pipe lines. It will be understood that the water may be heated to any desired temperature in a system of this type. The final temperature will depend upon the pressure in the tanks, the capacity of the submerged burners, and the rate of flow of the water through the system.

From the foregoing description, it will be seen that the invention provides a heating system of maximum thermal efficiency. Moreover, the apparatus can easily be dismantled and transported from one location to another and set up at a minimum of expense.

Obviously, the invention is not restricted to the particular embodiment thereof herein shown and described. Moreover, it is not indispensible that all of the features of the invention be used conjointly, since they may be employed advantageously in various combinations and sub-combinations.

What is claimed is:

1. A water heating system of the character described, comprising in combination, a water heating tank; a conduit connected to supply water under pressure to the tank; a discharge conduit connected to the bottom portion of the tank; means for maintaining a water level in the bottom portion of the tank; a submerged gas burner in the bottom of the tank; an air compressor connected to the burner to supply combustion supporting air thereto; a gas driven turbine connected to drive said air compressor; an outlet flue for the products of combustion connected to said tank delivering flue gas therefrom and connected to drive said turbine; a heat exchanger through which the products of combustion are passed to raise their temperature for driving said turbine; a vertical economizer tank connected to supply feed water to the heating tank; a feed water supply pipe connected to the economizer tank having a spray head in the upper portion thereof; an exhaust conduit from said gas driven turbine connected to said economizer tank to discharge exhaust gas in direct contact with the sprays of feed water; and an outlet flue connected to the upper end of the economizer tank.

2. A water heating system of the character described, comprising in combination, a water heating tank; a conduit connected to supply water under pressure to the tank; a discharge conduit connected to the bottom portion of the tank; means for maintaining a water level in the bottom portion of the tank; a submerged gas burner in the tank; an air compressor connected to the burner to supply combustion supporting air thereto; a gas driven turbine connected to drive said air compressor; and an outlet flue connected to said tank delivering flue gas therefrom and connected to drive said turbine; a heater connected to the outlet flue to increase the temperature of the flue gas; and an economizer utilizing the heat in the exhaust gas from said turbine connected to deliver pre-heated water to said supply conduit leading to said heating tank.

3. A water heating system of the character described, comprising in combination, a water heating tank; a conduit connected to supply water under pressure to the tank; a discharge conduit connected to the bottom portion of the tank; means for maintaining a water level in the bottom portion of the tank; a submerged gas burner in the tank; an air compressor connected to the burner to supply combustion supporting air thereto; a gas driven turbine connected to drive said air compressor; an outlet flue connected to said tank delivering flue gas therefrom and connected to drive said turbine; a gas-fired re-heater connected to the outlet flue to raise the temperature of the flue gas; and an economizer utilizing waste heat in the flue gas from the re-heater and the exhaust gas from said turbine connected to deliver pre-heated water to said conduit leading to said heating tank.

ERNEST B. MILLER.

References Cited in the file of this patent

UNITED STATES PATENTS

| Number | Name | Date |
|---|---|---|
| 594,858 | Christopher | Dec. 7, 1897 |
| 872,806 | de Ferranti | Dec. 3, 1907 |
| 1,230,417 | Lillie | June 9, 1917 |
| 2,032,368 | Kerr | Mar. 3, 1936 |
| 2,115,338 | Lysholm | Apr. 26, 1938 |
| 2,184,845 | Noack | Dec. 26, 1939 |
| 2,233,675 | Narten | Mar. 4, 1941 |